April 25, 1944.    L. D. NORDSTRUM    2,347,214
TORQUE MEASURING DEVICE

Filed May 1, 1941

Inventor:
Lauren D. Nordstrum,
by Harry E. Dunham
His Attorney.

Patented Apr. 25, 1944

2,347,214

UNITED STATES PATENT OFFICE 2,347,214

TORQUE MEASURING DEVICE

Lauren D. Nordstrum, Fort Wayne, Ind., assignor to General Electric Company, a corporation of New York Application May 1, 1941, Serial No. 391,356

9 Claims. (Cl. 265—24)

My invention relates to improvements in torque measuring devices and more particularly to such devices arranged to measure the torque of coaxial oppositely rotating shafts.

An object of my invention is to provide an improved torque measuring device for measuring the torque of coaxial oppositely rotating shafts.

Another object of my invention is to provide an improved tandem dynamometer construction for measuring the separate and combined torques of a pair of dynamometers having coaxial shafts adapted to be driven in opposite directions.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
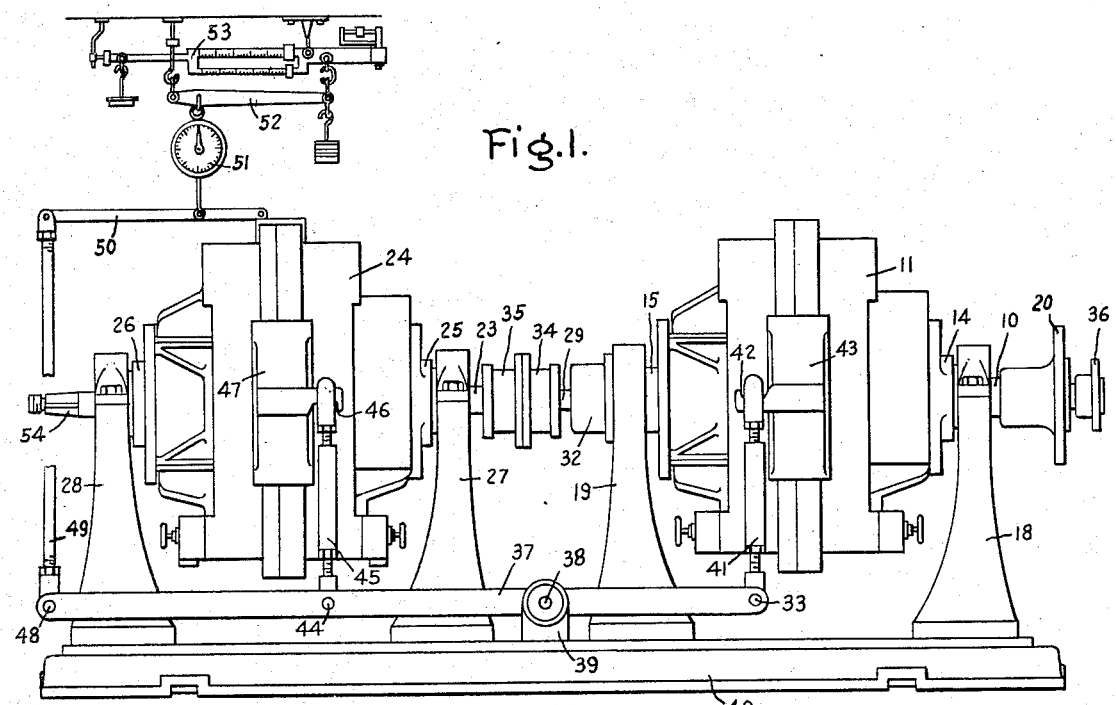
Figure 2:
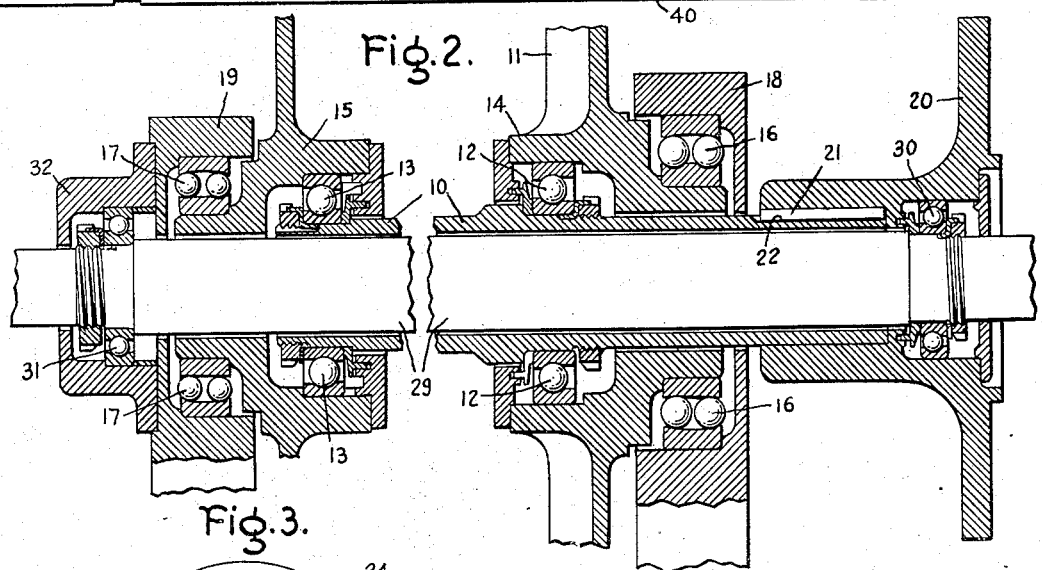
Figure 3:
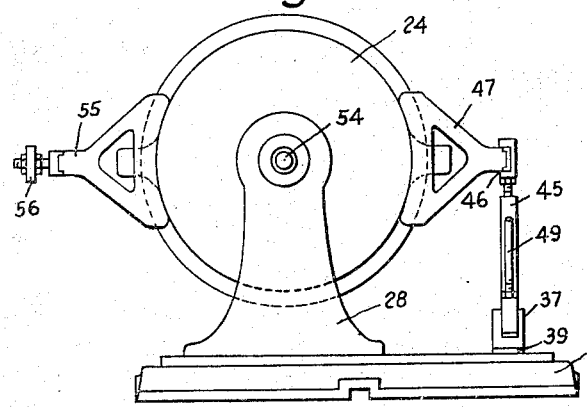

In the drawing, Fig. 1 is a side elevational view of a dynamometer set embodying my invention; Fig. 2 is an enlarged sectional view of the shafts and supporting bearings of the right-hand dynamometer shown in Fig. 1; and Fig. 3 is an end view of the arrangement shown in Fig. 1.

Certain types of drives include a plurality of substantially coaxial shafts adapted to rotate in different directions, and in testing the driving devices, it is desirable to be able to determine the separate torques of the different drive shafts as well as the simultaneous combined torque of all of the shafts rotating in their respective different directions. In order to measure these various torques, I provide a torque measuring device including a plurality of dynamometers having substantially coaxial shafts which are adapted to measure, separately or combined, the torques of a plurality of shafts rotating in different directions.

Referring to the drawing, I have shown a torque measuring device including a pair of axially spaced apart dynamometers arranged in tandem relationship. Each dynamometer is constructed as a complete unit which may be used to measure torque independently of the other unit. One dynamometer is provided with a rotatable member mounted on a hollow tubular sleeve or quill shaft 10 and is adapted to produce a torque reaction on a relatively rotatable torque reaction outer member 11. The hollow shaft 10 is rotatably supported on the torque reaction member 11 by ball bearings 12 and 13 at each end thereof arranged in bearing housings formed by hubs 14 and 15, respectively, of the torque reaction member 11. This member 11 also is rotatably supported at each end thereof by anti-friction ball bearings 16 and 17 which are arranged within bearing housings formed in pedestal supports 18 and 19, respectively. In order to provide a driving connection between the shaft 10 and a driving member, a coupling 20 is mounted on an end of the shaft 10 away from the other dynamometer and is rigidly secured thereon against relative rotational movement by a key 21 arranged in a keyway 22. The other dynamometer is provided with a rotatable member mounted on a shaft 23 and adapted to be rotated in a direction opposite to the direction of rotation of the other rotatable member and to provide a torque reaction on a relatively rotatable torque reaction outer member 24. This rotatable member of the second dynamometer is rotatably supported in bearings in hubs 25 and 26 of the outer member 24 arranged adjacent each end thereof, and the second dynamometer torque reaction member 24 is supported in relatively rotatable relationship with respect to its rotatable member and shaft 23 by bearings arranged about the hubs 25 and 26 in pedestal supports 27 and 28. In order to provide for connection of the two shafts 10 and 23 to substantially coaxial driving members, these shafts are arranged in substantially coaxial relationship and a third shaft 29 is arranged substantially coaxially within and is partially coextensive with the hollow shaft 10 and projects from each end thereof as shown in Fig. 2. This shaft 29 is rotatably supported within the hollow shaft 10 and in relatively rotatable relationship thereto by ball bearings 30 arranged within a bearing housing formed in the coupling member 20 and by ball bearings 31 supported in a bearing housing 32 mounted on the pedestal support 19. The shaft 29 is provided with a coupling member 34, and is adapted to be connected to the shaft 23 by securing the coupling member 34 to a complementary coupling member 35 mounted on the shaft 23. A coupling member 36 is rigidly secured to the shaft 29 on the end thereof opposite the coupling member 34 and is adapted to provide a connection between the rotatable member mounted on the shaft 23 and a driving element for driving the rotatable member of the second dynamometer.

In order to measure the torque of the torque reaction members, a linkage is provided for connecting the torque reaction members to a force indicating device, and includes a longitudinally extending dynamometer lever arm 37 pivotally mounted by a pivot pin 38 on a support 39 arranged longitudinally intermediate the two dynamometers and mounted on a base 40. One end of the dynamometer lever member 37 is pivotally connected by a pivot pin 33 to an adjustable link 41 which engages a knife edge 42 secured to a bracket 43 on the torque reaction member 11. The lever member 37 also is pivotally secured by a pivot pin 44 to an adjustable link 45 arranged in engagement with a knife edge 46 mounted on a bracket 47 secured to the torque reaction member 24. These connections of the dynamometer lever member 37 to the torque reaction members 11 and 24 are arranged one on each side of the pivotal mounting 38, so that opposite torque reactions produced in the torque reaction members 11 and 24 will tend to bias the dynamometer lever member 37 in the same direction. The end of the lever 37 away from the pivot pin 40 is pivotally connected by a pivot pin 48 to a link 49 which is pivotally connected to the end of a lever 50 connected to a spring scale 51 and a set of balance arms 52 and 53 of a force indicating device for measuring the torque reaction of the torque reaction members 11 and 24. The torque reaction of either of the dynamometers may be measured separately by disconnecting the dynamometer lever member 37 from its connection to the torque reaction member which is not to be used. In this manner, by disconnecting the link 45 from the pivotal connection 44 and connecting only the coupling member 20 to a driving element, the torque of the torque reaction member 11 may be measured independently of the member 24. Similarly, by disconnecting the link 41 from the pivotal connection 33 and connecting an extension 54 of the shaft 23 to a driving element, the torque of the torque reaction member 24 can be measured separately from the torque reaction member 11. Furthermore, by connecting together the coupling members 34 and 35 and connecting the coupling member 36 to a driving element with the link 41 disconnected from the pivotal connection 33, the torque of the torque reaction member 24 may be measured separately from the torque reaction member 11. In order to obtain an accurate combined measurement of the torque of the torque reaction members 11 and 24, pivot pins 40 and 44 are arranged an equal distance away from the pivot pin 38 of the pivotal mounting 39. Inequalities in the balance of the dynamometers can be compensated by a balance weight arm 55 mounted on each of the torque reaction members 11 and 24 on the side thereof away from the dynamometer lever member 37 and a radially movable balance weight 56 adjustably secured to the bracket 55, so that it may be moved toward or away from the axis of the torque reaction members to obtain the desired balance. With this torque measuring device construction, the torque of a plurality of oppositely rotating driving members may accurately be determined, and the torque of such members may be measured either separately or combined by the same device.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A torque measuring device including a plurality of rotatable members and a corresponding plurality of relatively rotatable torque reaction members adapted to cooperate with said rotatable members, coaxial means for connecting said rotatable members to driving means for rotation of different of said rotatable members in different directions, a force indicating device, and means including a lever detachably connected to said torque reaction members and connected to said force indicating device for measuring the separate and combined torque reaction of said torque reaction members.

2. A torque measuring device for measuring the output of a plurality of coaxial oppositely rotating shafts and including a plurality of rotatable members and a corresponding plurality of relatively rotatable torque reaction members adapted to cooperate with said rotatable members, coaxial coupling means including two relatively rotatable coaxial and partially coextensive shafts for connecting said rotatable members to said first-mentioned shafts for rotation of different of said rotatable members in different directions, and means for measuring the combined torque reaction of all of said torque reaction members.

3. A torque measuring device including a plurality of rotatable members and a corresponding plurality of relatively rotatable torque reaction members adapted to cooperate with said rotatable members, means including a corresponding plurality of coaxial shafts connected to said rotatable members and arranged to be coupled at the same end of said device to different driving means for connecting said rotatable members to driving means for rotation of different of said rotatable members in different directions, means for supporting said plurality of shafts rotatably relatively to each other, means for rotatably supporting said torque reaction members, means for rotatably supporting said rotatable members on said torque reaction members, and means for measuring the combined torque reaction of said torque reaction members.

4. A torque measuring device including a pair of axially spaced apart rotatable members and a corresponding pair of axially spaced apart relatively rotatable torque reaction members each adapted to cooperate with one of said rotatable members, means for rotatably supporting said torque reaction members in tandem relationship, means including a hollow shaft for rotatably supporting one of said rotatable members, means including another shaft for rotatably supporting the other of said rotatable members, means for connecting said hollow shaft to a driving means, means extending substantially coaxially through said hollow shaft for connecting said other shaft to another driving means for rotation in a direction opposite to the rotation of said hollow shaft, and means for measuring the torque of said torque reaction members.

5. A torque measuring device including a pair of rotatable members and a pair of relatively rotatable torque reaction members adapted to cooperate with said rotatable members, means for rotatably supporting said torque reaction members, means including a hollow shaft for rotatably supporting one of said rotatable members, means including another shaft for rotatably supporting the other of said rotatable members, means for connecting said hollow shaft to a driving means, means including a third shaft extending substantially coaxially through said hollow shaft and rotatably supported relatively thereto for connecting said other shaft to another driving means for rotation in a direction opposite to the rotation of said hollow shaft, and means for measuring the torque reaction of said torque reaction members.

6. A torque measuring device including a pair of rotatable members and a pair of relatively rotatable torque reaction members adapted to cooperate with said rotatable members, means for rotatably supporting said torque reaction members, means including a hollow shaft for rotatably supporting one of said rotatable members, means including another shaft for rotatably supporting the other of said rotatable members, means for connecting said hollow shaft to a driving means, means extending substantially coaxially through said hollow shaft for connecting said other shaft to another driving means for rotation in a direction opposite to the rotation of said hollow shaft, and means for measuring the combined torque reaction of all of said torque reaction members.

7. A torque measuring device including a pair of rotatable members and a pair of relatively rotatable torque reaction members adapted to cooperate with said rotatable members, means for rotatably supporting said torque reaction members, means including a hollow shaft for rotatably supporting one of said rotatable members on one of said torque reaction members, means including another shaft for rotatably supporting the other of said rotatable members on the other of said torque reaction members, means for connecting said hollow shaft to a driving means, means extending substantially coaxially through said hollow shaft for connecting said other shaft to another driving means for rotation in a direction opposite to the rotation of said hollow shaft, and means for measuring the separate and combined torque reactions of said torque reaction members.

8. A torque measuring device including a pair of rotatable members and a pair of relatively rotatable torque reaction members each adapted to cooperate with one of said rotatable members, means for connecting said rotatable members to driving means for rotation of each of said rotatable members in an opposite direction, means including a linkage for measuring the torque reaction of said torque reaction members, said linkage including a longitudinally extending member, means for pivotally mounting said longitudinally extending member, means for connecting said longitudinally extending member to one of said torque reaction members on one side of said pivotal mounting, means for connecting said longitudinally extending member to the other of said torque reaction members on the other side of said pivotal mounting from said first mentioned connection, a force indicating device, and means for connecting said longitudinally extending member to said force indicating device.

9. A torque measuring device for measuring the output of a plurality of coaxial oppositely rotating shafts including a member rotatable in one direction, a second member rotatable in the opposite direction, relatively rotatable torque reaction members adapted to cooperate with said rotatable members, means for connecting said rotatable members to said rotating shafts for rotation of said rotatable members in opposite directions, a force indicating device, and means including a lever connected to said torque reaction members and to said force indicating device for measuring the combined torques of said torque reaction members.

LAUREN D. NORDSTRUM.